US012800419B2

(12) United States Patent
Russell

(10) Patent No.: US 12,800,419 B2
(45) Date of Patent: Nov. 17, 2026

(54) REMOTE SEAL SYSTEM HAVING AMBIENT AIRFLOW COOLING

(71) Applicant: Rosemount Inc., Shakopee, MN (US)

(72) Inventor: Trentin T. Russell, Duluth, MN (US)

(73) Assignee: Rosemount Inc., Shakopee, MN (US)

( * ) Notice: Subject to any disclaimer, the term of this patent is extended or adjusted under 35 U.S.C. 154(b) by 306 days.

(21) Appl. No.: 18/606,308

(22) Filed: Mar. 15, 2024

(65) Prior Publication Data

US 2025/0290816 A1 Sep. 18, 2025

(51) Int. Cl.

*G01L 19/06* (2006.01)
*F16L 53/75* (2018.01)
*G01L 19/04* (2006.01)

(52) U.S. Cl.

CPC .......... *G01L 19/0645* (2013.01); *F16L 53/75* (2018.01); *G01L 19/04* (2013.01)

(58) Field of Classification Search

CPC ........... F16L 23/18; F16L 53/75; G01F 23/14; G01L 19/0046; G01L 19/0645; G01L 19/0681; G01L 19/086; G01L 5/00; G01L 7/082; G01L 7/084; G01L 13/025; G01L 13/026; G01L 19/0007; G01L 19/003; G01L 19/0092; G01L 19/04; G01L 19/06; G01L 19/0618; G01L 9/025; G01L 9/125

See application file for complete search history.

(56) References Cited

U.S. PATENT DOCUMENTS

| | | | | | |
|---|---|---|---|---|---|
| 3,124,959 | A * | 3/1964 | Pall | G01L 7/082 | 73/716 |
| 3,520,169 | A * | 7/1970 | Owen | B21C 37/22 | 29/727 |
| 4,259,771 | A * | 4/1981 | Ogata | B21C 37/26 | 165/184 |
| 4,352,227 | A * | 10/1982 | Ogata | B21C 37/26 | 165/184 |
| 5,343,015 | A * | 8/1994 | Ryan | B23K 26/302 | 219/121.64 |
| 5,753,821 | A | 5/1998 | Chou | | |
| 6,038,961 | A | 3/2000 | Filippi et al. | | |

(Continued)

FOREIGN PATENT DOCUMENTS

| | | | | |
|---|---|---|---|---|
| CN | 110411642 | A * | 11/2019 | G01L 19/0681 |
| DE | 4025664 | C1 * | 12/1991 | G01L 9/006 |

(Continued)

OTHER PUBLICATIONS

Diaphragm Design Guidebook, 2018 DiaCom Corporation (Year: 2018).*

(Continued)

*Primary Examiner* — David L Singer
(74) *Attorney, Agent, or Firm* — Christopher R. Christenson; Kelly, Holt & Christenson, P.L.L.C.

(57) ABSTRACT

A remote seal system includes a process fluid diaphragm, a mechanical link, and a fill fluid diaphragm. The process fluid diaphragm has a first side configured for exposure to a process fluid and a second side, opposite the first side, that is configured to contact the mechanical link. The mechanical link in contact with the second side of the process diaphragm. The fill fluid diaphragm has a first side in contact with the mechanical link and a second side configured for exposure to a remote seal fill fluid.

19 Claims, 5 Drawing Sheets

(56) References Cited

U.S. PATENT DOCUMENTS

| | | | | | |
|---|---|---|---|---|---|
| 6,059,254 | A * | 5/2000 | Sundet | G01L 19/0007 | 248/678 |
| 7,258,017 | B1 | 8/2007 | Hedtke | | |
| 7,377,174 | B2 | 5/2008 | Sundet | | |
| 7,412,893 | B2 | 8/2008 | Hedtke | | |
| 7,434,469 | B2 | 10/2008 | Hedtke | | |
| 8,485,040 | B2 * | 7/2013 | Petersen | G01L 19/0663 | 73/706 |
| 9,109,937 | B2 | 8/2015 | Scheldorf et al. | | |
| 9,274,018 | B2 | 3/2016 | Miller et al. | | |
| 9,389,106 | B2 | 7/2016 | Breen et al. | | |
| 9,562,819 | B2 | 2/2017 | Fadell et al. | | |
| 11,009,897 | B2 | 5/2021 | Lauzon et al. | | |
| 11,313,747 | B2 | 4/2022 | Hoffman et al. | | |
| 2005/0126296 | A1 * | 6/2005 | Hedtke | G01L 19/0645 | 340/626 |
| 2009/0120181 | A1 * | 5/2009 | Schumacher | G01L 19/0092 | 73/292 |
| 2009/0308170 | A1 * | 12/2009 | Broden | G01L 19/0645 | 73/723 |
| 2016/0084725 | A1 * | 3/2016 | Hoffman | F16L 23/006 | 285/41 |
| 2016/0091383 | A1 * | 3/2016 | Hoffman | G01L 19/0681 | 73/706 |
| 2017/0016789 | A1 * | 1/2017 | Fadell | G01L 19/04 | |
| 2020/0096404 | A1 | 3/2020 | Fadell et al. | | |

FOREIGN PATENT DOCUMENTS

| | | | | | |
|---|---|---|---|---|---|
| JP | 2009-281827 | A2 | | 12/2009 | |
| JP | 2009281827 | A | * | 12/2009 | G01L 19/06 |
| KR | 20060033021 | A | * | 4/2006 | H04R 19/04 |
| WO | WO-2018063148 | A1 | * | 4/2018 | G01L 19/06 |

OTHER PUBLICATIONS

John DeBone, Metal Diaphragm Material Selection, Hudson Technologies, webpage <https://info.hudson-technologies.com/blog/metal-diaphragm-material-selection> (Year: 2021).*

Foil Diaphragms & Applications, Hudson Technologies, retrieved from Internet Archive Wayback Machine <https://web.archive.org/web/20230322212754/https://www.hudson-technologies.com/applications/metal-diaphragms/foil/> (Year: 2023).*

Metal Diaphragm Design, Hudson Technologies, retrieved from Internet Archive Wayback Machine <https://web.archive.org/web/20231130131358/https://www.hudson-technologies.com/applications/metal-diaphragms/design/> (Year: 2023).*

Jeng et al, The effects of vent channels and metal conductive base on thermal characteristics of the active graphite-composite cylindrical heat sink, International Communications in Heat and Mass Transfer 73 (2016) 7-15 (Year: 2016).*

Search Report and Written Opinion for PCT Application No. PCT/US2025/019680, dated Jun. 25, 2025, 9 pages.

* cited by examiner

REMOTE SEAL SYSTEM HAVING AMBIENT AIRFLOW COOLING

BACKGROUND

In some process control system installations, a pressure transmitter is used to remotely monitor the pressure of a process fluid in a conduit or storage tank. The pressure transmitter includes circuitry that measures or otherwise obtains an electrical indication of a pressure sensor that is hydraulically coupled to the remote location of the pressure being monitored. The magnitude of the pressure sensor signal represents the pressure of the process fluid at the remote location.

Remote seals, or remote diaphragm assemblies, are sometimes used to space the pressure transmitter (which includes a number of electronic circuits) from the hazardous measurement environments or for coupling the pressure transmitter to process fluid measurement locations that are inconveniently located. For example, remote process seals can be used with corrosive, high temperature process fluids such as those used in refineries or chemical plants. However, in some high temperature applications the temperature can be too high for the remote seal to function properly. Providing an improved remote seal system that could measure process fluid pressure in these extended high temperature applications would provide improved process control for these applications.

The order of pressure propagation from the process fluid to the pressure transmitter is as follows. First, a diaphragm on the remote seal (remote seal diaphragm) is connected directly to the process fluid. Next, there is fluid behind the remote seal diaphragm (remote seal fill fluid) that fills the entire remote seal system. The remote seal is connected to a transmitter module and the remote seal fill fluid extends until it meets another diaphragm on the transmitter module. There is another fluid (transmitter fill fluid) behind the diaphragm on the transmitter module. The transmitter fill fluid extends all the way to the pressure sensitive element(s) in the transmitter module. The pressure sensitive element(s) behave predictably in response to pressure changes and the behavior is monitored (electrically), processed, and interpreted by electronics in the transmitter module, giving a pressure readout to a remote device or user interface.

SUMMARY

A remote seal system includes a process fluid diaphragm, a mechanical link, and a fill fluid diaphragm. The process fluid diaphragm has a first side configured for exposure to a process fluid and a second side, opposite the first side, that is configured to contact the mechanical link. The mechanical link in contact with the second side of the process diaphragm. The fill fluid diaphragm has a first side in contact with the mechanical link and a second side configured for exposure to a remote seal fill fluid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

There are a number of industrial applications that operate at significantly elevated temperatures, such as at or above 420 degrees C. Pressure measurement systems for such applications are limited. One of the difficulties of using a traditional remote seal with such applications is that the remote seal fill fluid, which is generally separated from the process fluid by an isolation diaphragm, will vaporize and the output of the system will report incorrect pressure values. In such instances, it is also possible that the system will be irreversibly damaged.

Embodiments provided herein generally provide an improved remote seal system that spaces the remote seal fill fluid sufficiently from the process fluid diaphragm such that remote seal fill fluid vaporization does not occur even at process fluid temperatures up to 800 degrees C.

Figure 1:
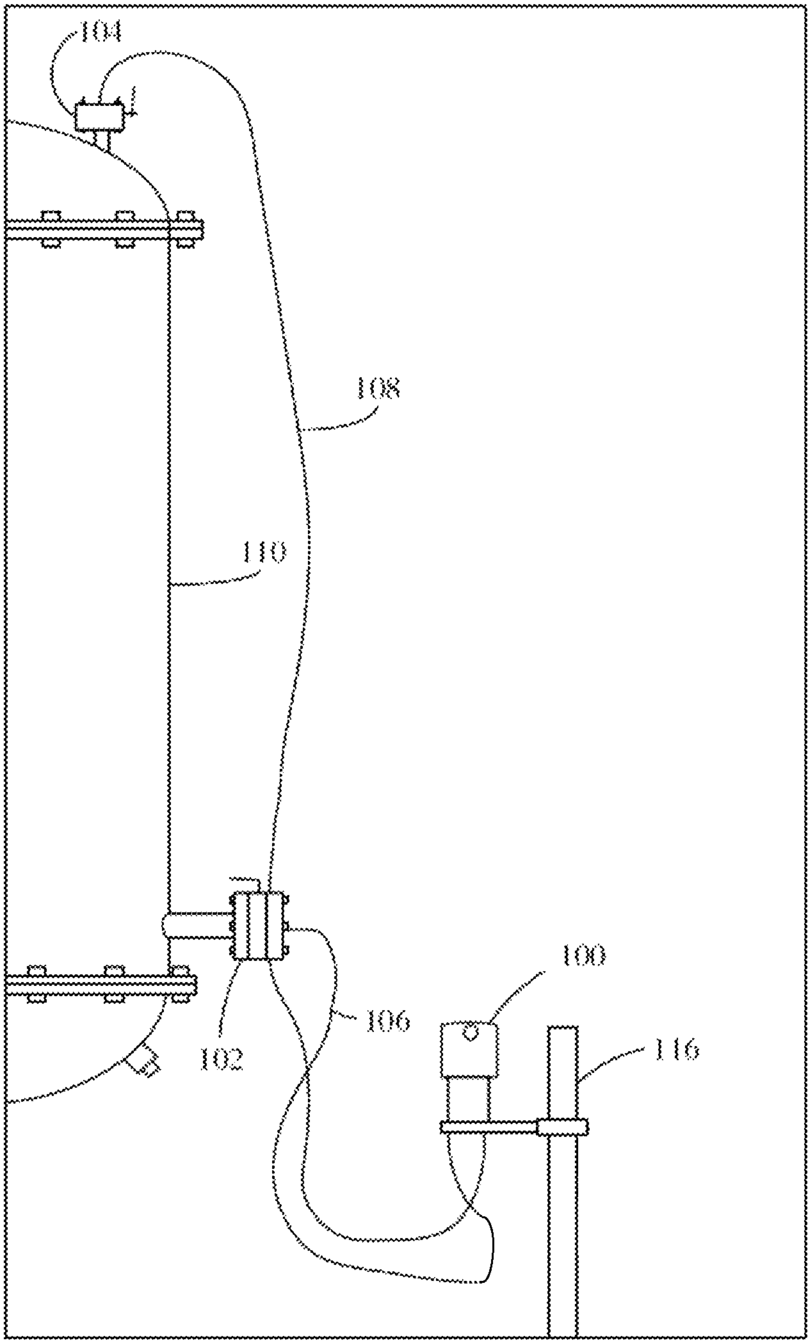
FIG 1 (Prior Art)
FIG. 1 is a diagrammatic view of a process fluid pressure measurement system using a pair of remote seals in accordance with the prior art.

FIG. 1 is a diagrammatic view of a process fluid pressure measurement system using a remote seal in accordance with the prior art. As shown in FIG. 1, pressure transmitter 100 is hydraulically coupled to remote seals 102, 104 via respective capillary tubes 106, 108. Each remote seal 102, 104 is mounted to process fluid container 110 and includes an isolation diaphragm that is configured to deflect, which causes a remote seal fill fluid (which is substantially incompressible) on an opposite side of the isolation diaphragm from the process fluid to move and translate pressure changes through the respective capillary tube 106, 108 to a pressure sensor located in or on pressure transmitter 100. The flexible isolation diaphragm thus hydraulically isolates the process fluid from remote seal fill fluid in the capillary tube. However, for high temperature applications, heat of the process fluid may easily conduct through the thin metal isolation diaphragm to heat the remote seal fill fluid. In extreme examples, the remote seal fill fluid may change phase or vaporize and thereafter no longer be substantially incompressible. When this happens, the signal of the pressure sensor in the pressure transmitter will no longer accurately reflect the process pressure.

In the example shown, the remote seals are operably coupled to a fluid containment tank 110. Sometimes, the difference in pressure between the indications from remote seal 104 and remote seal 102 can provide an indication of fluid level within tank 110. However, remote seals are also used in situations where it is useful to simply know pressure in the tank, in which case only a single remote seal is required. Additionally, remote seals can be used on conduits, such as process fluid pipes.

Figure 2:
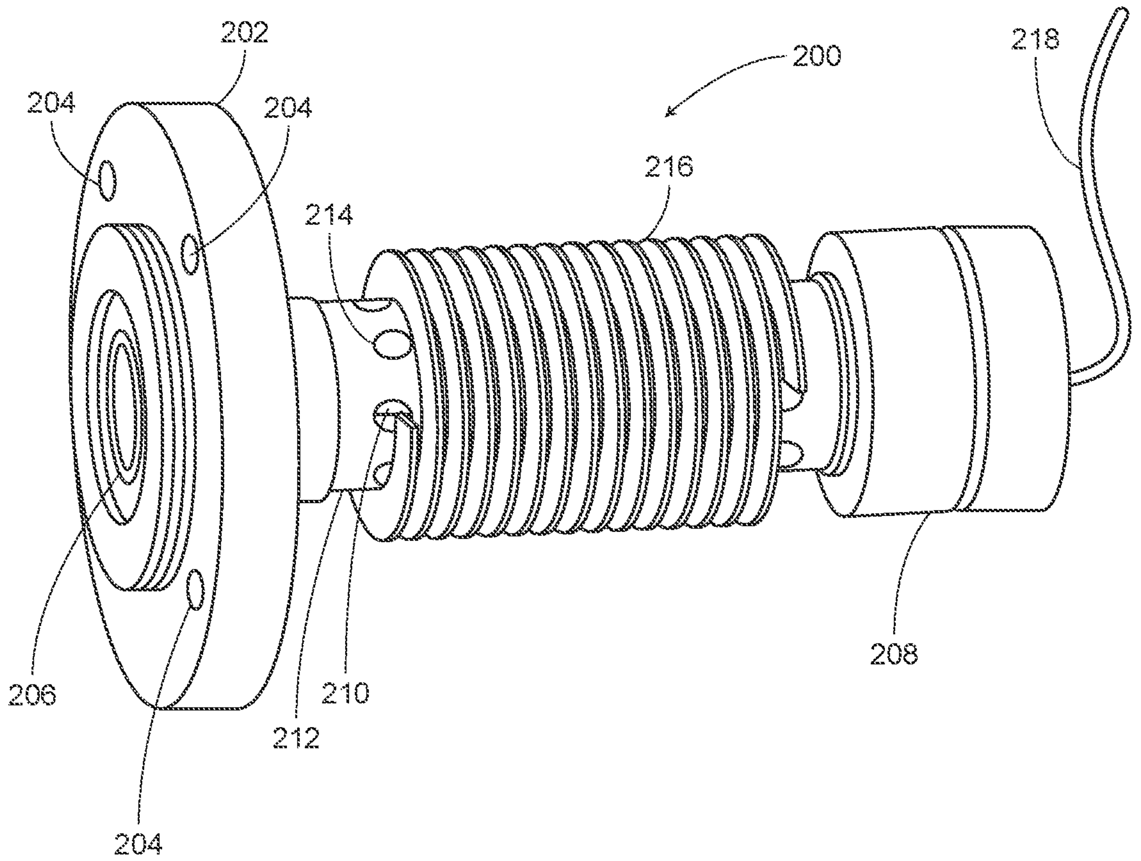
FIG. 2 is a diagrammatic view of an improved remote seal system in accordance with an embodiment of the present invention.

FIG. 2 is a diagrammatic view of an improved remote seal system in accordance with an embodiment of the present invention. Remote seal system 200 includes a process mounting flange 202 that is configured to mount to a process, such as a process container (e.g., tank 110) or a process conduit or pipe. Flange 202 includes a number of mounting holes 204 through which bolts (shown in FIG. 3) pass to couple flange 202 to the process. Remote seal system 200 also includes process fluid diaphragm 206 that is configured to be exposed directly to the high temperature process fluid. However, in the embodiment shown in FIG. 2, remote seal fill fluid does not contact an opposite side of the process fluid diaphragm. Instead, a fill fluid diaphragm (shown in FIG. 3) is located within fill fluid housing 208 and is mechanically coupled to process fluid diaphragm 206 via link 210. However, in very high temperature applications, it is possible for heat to be conducted along link 210. Thus, in some examples, an external tube 212 surrounds link 210 but includes a number of ventilation holes 214 to allow ambient air to flow freely through the inside of remote seal 200 and to cool link 210. This is helpful because heat conduction through link 210 will increase the temperature of the remote seal fill fluid in fill fluid housing 208 and capillary 218. The number and size of the holes are designed to provide ample cooling while still ensuring sufficient structural integrity of tube 212.

Additionally, cooling can be increased by using a number of fins 216 located along the path of link 210. Preferably, fins 216 are oriented such that the fin surface is substantially perpendicular to the ground. Thus, in the illustrated example, fins 216 are substantially vertical and remote seal system 200 is intended to be mounted such that link 210 extends horizontally over the ground. In embodiments where link 210 extends straight up or straight down from process piping, fins 216 may have a fin surface that runs parallel to link 210.

In the illustrated example, fins 216 are tension attached fins attached to tube 212 to increase surface area and maximize heat dissipation before it can reach the remote seal fill fluid in fill fluid housing 208. Preferably, fins 216 are attached to tube 212 by mechanical tension and then ends are welded to tube 212.

Given the temperatures to which embodiments described herein will be subjected, thermal expansion/contraction of various components becomes an important design consideration. If any of the materials in the remote seal system have differing rates of thermal expansion, then measurement accuracy of the system will be negatively affected. Preferably, all components of remote seal system 200 are formed of the same metal such to minimize the effects of thermal expansion/contraction. However, those skilled in the art will recognize that embodiments can be practiced where multiple different materials are used. The metal selected for remote seal system can be any suitable metal based on the anticipated process conditions. For example, for extremely corrosive environments, remote seal system 200 may be constructed from alloy C-276. For cost-sensitive applications operating at or below 600 degrees C., remote seal system 200 may be constructed from carbon steel. However, embodiments can also be constructed from 316L stainless steel. In applications where the process fluid is a molten salt, remote seal system 200 may be constructed of Hastelloy N (UNS N10003).

Figure 3:
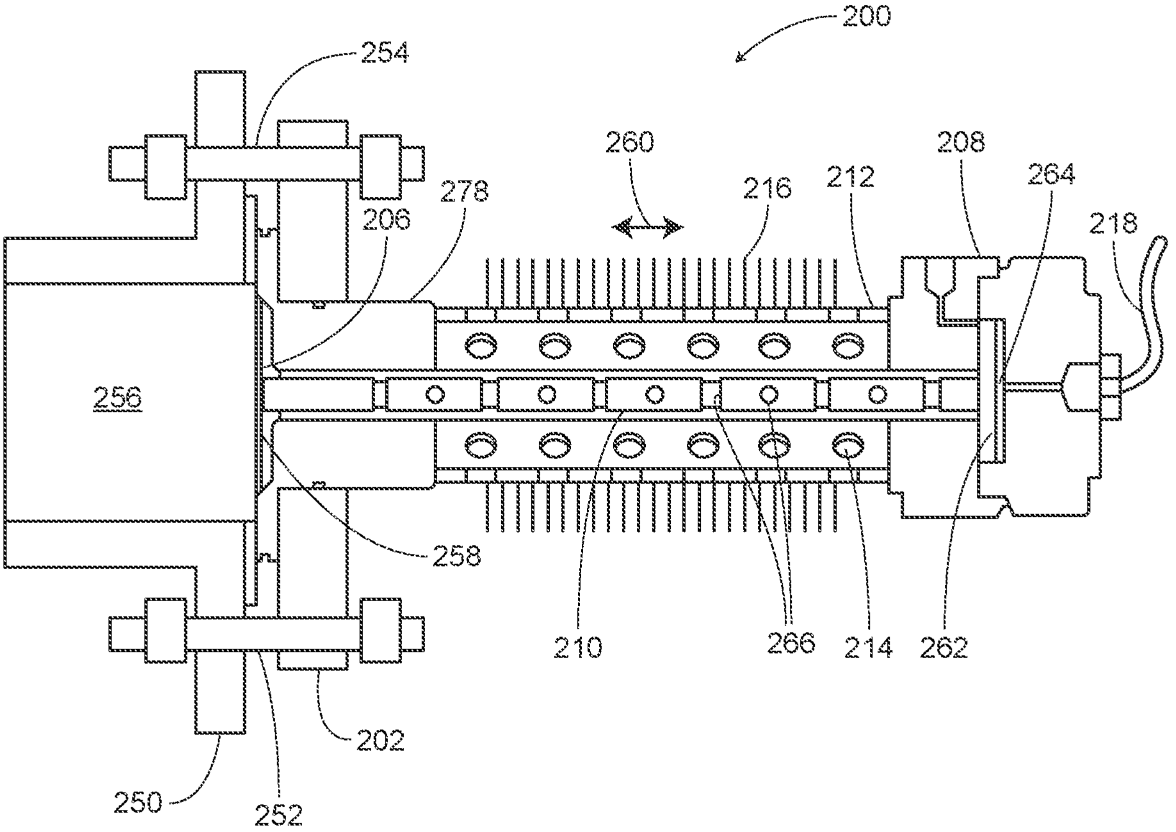
FIG. 3 is a cross-sectional view of a remote seal system in accordance with an embodiment of the present invention.

FIG. 3 is a cross-sectional view of a remote seal system in accordance with an embodiment of the present invention. FIG. 3 illustrates remote seal system 200 mounted to a process. More specifically, mounting flange 202 of remote seal system 200 is couple to a pipe flange 250 using a plurality of fasteners 252, 254. Within pipe flange 250, hot process fluid 256 contacts process fluid diaphragm 206. The pressure of process fluid 256 deflects process fluid diaphragm 206 and causes link 210, which contacts side 258 of process fluid diaphragm 206 to move in the direction indicated by arrow 260. This movement of link 210, which is coupled to fill fluid diaphragm 262, causes fill fluid diaphragm 262 to deflect and move remote seal fill fluid 264. Remote seal fill fluid 264 conveys this change through capillary 218 to a pressure sensor in pressure transmitter 100 (shown in FIG. 1). In the embodiment illustrated in FIG. 3, link 210 includes a number of apertures 266 that allow air to flow through link 210 in order to help cool link 210. Additionally, the illustrated example shows apertures 266 running vertically and into the plane of the page, thus showing that such aperture 266 may be spaced apart from one another and disposed substantially perpendicular to their neighbor aperture. This feature facilitates convective cooling of link 210 regardless of the operating orientation of link 210.

Figure 4A:
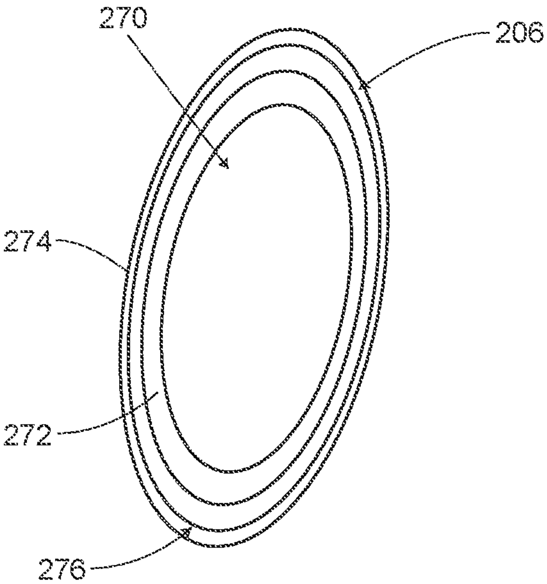
FIGS. 4A-4C are diagrammatic views of a process fluid isolation diaphragm of an improved remote seal system in accordance with an embodiment of the present invention.
Figure 4C:
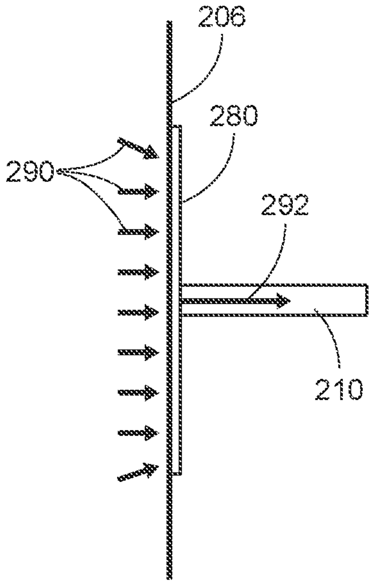
Figure 4B:
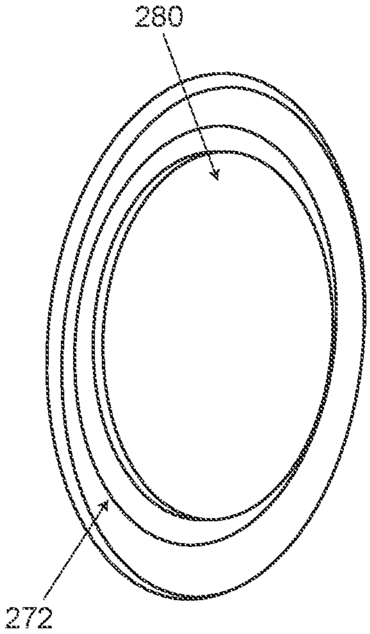

FIGS. 4A-4C are diagrammatic views of a process fluid diaphragm of an improved remote seal system in accordance with an embodiment of the present invention. Process fluid diaphragm 206 includes front face 270 that is configured to be exposed to the process fluid. A relatively thinner convolution 272 is located toward an outer edge 274 of diaphragm 206. A scaling face 276 is adjacent outer edge 274 and is configured to be coupled (e.g., welded, brazed, clamped, et cetera) to remote seal body 278 (shown in FIG. 3).

FIG. 4B depicts a rear (opposite) face of process fluid diaphragm 206. As can be seen in FIG. 4B, a central disc 280 is provided and is of sufficient thickness to translate its movement to link 210 (shown in FIG. 3) without bending. Thus, thinner convolution 272 will allow deflection of process fluid diaphragm 206, but central disc portion 280 is robust enough to effectively convey such deflection to link 210.

FIG. 4C illustrates process fluid pressure (indicated diagrammatically as a number of arrows 290) acting on process fluid diaphragm 206 to cause disc portion 280 on a rear side of process fluid diaphragm 206 to generate a force 292 along link 210. As shown in FIG. 4C, link 210 preferably extends perpendicularly from a center of disc portion 280.

Figure 5A:
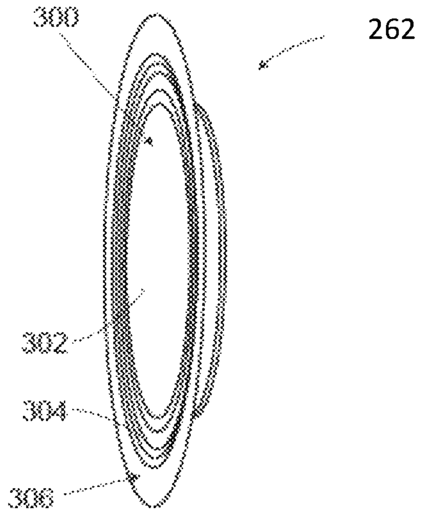
FIGS. 5A-5C are diagrammatic views of a fill fluid diaphragm of an improved remote seal system in accordance with an embodiment of the present invention.
Figure 5C:
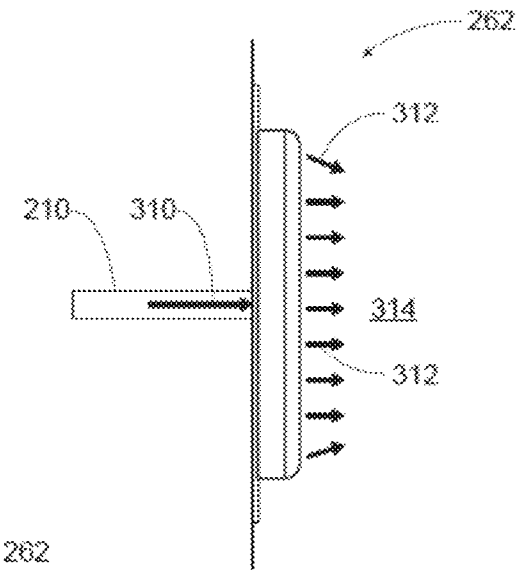
Figure 5B:
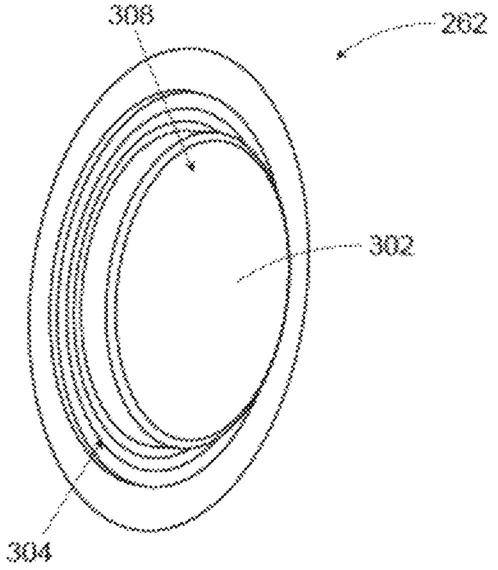

FIGS. 5A-5C are diagrammatic views of a fill fluid diaphragm of an improved remote seal system in accordance with an embodiment of the present invention. FIG. 5A is a perspective view showing a front surface 300 of fill fluid diaphragm 262. Fill fluid diaphragm 262, like process fluid diaphragm 206 includes a central disc portion 302 that is configured to contact link 210. Additionally, fill fluid diaphragm 262 includes one or more convolutions 304 that allow fill fluid diaphragm to deflect in response to pressure applied by link 210. Fill fluid diaphragm 262 also includes a diaphragm seal face 306 that is configured to be mounted to fill fluid housing 208 preferably by welding.

FIG. 5B is a perspective view showing a rear face of fill fluid diaphragm 262. As shown, fill fluid diaphragm 262 includes a rear face 308 that is configured to contact a substantially incompressible remote seal fill fluid. The remote seal fill fluid can be any suitable liquid, including, without limitation silicone oil or UltraTherm 805. This remote seal fill fluid will hydraulically translate the pressure up the capillary, such as capillary 218 (shown in FIGS. 2 and 3) and can be measured by pressure transmitter 100. Central disc portion 302 helps ensure that fill fluid diaphragm 262 does not merely conform around link 210 as link 210 applies pressure to fill fluid diaphragm 262.

FIG. 5C illustrates force from link 210 (indicated diagrammatically at arrow 310 acting on central portion 302 of fill fluid diaphragm 262 to cause disc portion central portion 302 to generate a hydraulic force 312 within remote seal fill fluid 314. As shown in FIG. 5C, link 210 preferably extends perpendicularly to central portion 302. Remote seal fill fluid 314 is then conveyed through a capillary, such as capillary 218 (shown in FIGS. 2 and 3) to a pressure transmitter, such as pressure transmitter 100 (shown in FIG. 1).

The thicker central regions of process fluid diaphragm 206 and fill fluid diaphragm 262 can be formed in any suitable manner. However, in one embodiment, the thicker central regions are formed by plating the diaphragm in the central area with additional material until a desired thickness is achieved.

Embodiments described herein generally provide a remote seal system that, while still providing the advantages of using a remote seal fill fluid and capillary connection to a process pressure transmitter, moves the remote seal fill fluid away from the hot process. In the described examples this is done by using a pair of diaphragms separated by a mechanical link such that process fluid operates on a first diaphragm and remote seal fill fluid contacts the second diaphragm. It is believed that embodiments described herein will allow accurate process pressure measurements for process fluids having temperatures as high as 800 degrees C. Further, brief temperature excursions as high as 1000 degrees may be tolerated. This should allow embodiments described herein to be used in high temperature pressure measurement environments, such as measuring the pressure of liquid salt processes.

While embodiments described above generally illustrate a new remote seal system coupled directly to a process vessel, it is also expressly contemplated that embodiments described herein could be an attachment to a legacy remote seal.

Although the present invention has been described with reference to preferred embodiments, workers skilled in the art will recognize that changes may be made in form and detail without departing from the spirit and scope of the invention. It is believed that embodiments described herein are useful for any type of pressure measurement application. Further, while embodiments are described with respect to protecting a remote seal fill fluid from extreme heat, it should be noted that embodiments also provide such protection from extreme cold, such as those present in cryogenic fluid processing applications.

What is claimed is:

1. A remote seal system, comprising:

a process fluid diaphragm having a first side configured for exposure to a process fluid and a second side, opposite the first side;

a mechanical link in contact with the second side of the process fluid diaphragm, wherein the mechanical link includes a plurality of apertures therethrough, the plurality of apertures being spaced apart from one another and configured to allow airflow through the mechanical link; and a fill fluid diaphragm having a first side in contact with the mechanical link and a second side configured for exposure to a remote seal fill fluid.

2. The remote seal system of claim 1, wherein all components of the remote seal system are constructed from the same material.

3. The remote seal system of claim 2, wherein the material is selected from the group consisting of carbon steel, C-276, 316L stainless steel, and Hastelloy N.

4. The remote seal system of claim 1, wherein the process fluid diaphragm is coupled to a remote seal body and the fill fluid diaphragm is coupled to a fill fluid housing.

5. The remote seal system of claim 4, wherein the remote seal body and the fill fluid housing are mounted to opposite ends of a tube through which the mechanical link passes.

6. The remote seal system of claim 5, wherein the tube includes a plurality of ventilation holes.

7. The remote seal system of claim 5, and further comprising at least one heat transfer fin mounted to the tube.

8. The remote seal system of claim 7, wherein the at least one heat transfer fin includes a fin surface that is perpendicular to a longitudinal axis of the tube.

9. The remote seal system of claim 7, wherein the at least one heat transfer fin is attached to the tube by tension.

10. The remote seal system of claim 7, wherein an end of the at least one heat transfer fin is welded to the tube.

11. The remote seal system of claim 1, wherein the mechanical link is a rod having a first end coupled to the second side of the process fluid diaphragm and a second end coupled to the first side of the fill fluid diaphragm.

12. The remote seal system of claim 1, wherein the mechanical link extends substantially perpendicularly between the process fluid diaphragm and the fill fluid diaphragm.

13. The remote seal system of claim 1, wherein at least one of the plurality of apertures has a longitudinal axis that is perpendicular to a longitudinal axis of another of the plurality of apertures.

14. The remote seal system of claim 1, wherein the process fluid diaphragm includes a thicker central region disposed within at least one convolution.

15. The remote seal system of claim 14, wherein the thicker central region is formed by plating.

16. The remote seal system of claim 1, wherein the fill fluid diaphragm includes a thicker central region disposed within at least one convolution.

17. The remote seal system of claim 16, wherein the thicker central region is formed by plating.

18. The remote seal system of claim 1, and further comprising a capillary hydraulically coupled to the second side of the fill fluid diaphragm.

19. The remote seal system of claim 18, and further comprising a pressure transmitter operably coupled to the capillary.

* * * * *